(12) United States Patent
Wunderlich et al.

(10) Patent No.: US 10,397,309 B2
(45) Date of Patent: Aug. 27, 2019

(54) SYSTEMS AND METHODS OF IMPLEMENTING TRACKING OF RESOURCE USAGE FOR A CLOUD-BASED SYSTEM

(71) Applicant: salesforce.com, inc., San Francisco, CA (US)

(72) Inventors: James Bock Wunderlich, Burlingame, CA (US); Forrest Junod, San Francisco, CA (US); Gregory D. Fee, Seattle, WA (US); Mike Boilen, Kirkland, WA (US); Nicholas Chun Yuan Chen, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 626 days.

(21) Appl. No.: 14/711,485

(22) Filed: May 13, 2015

(65) Prior Publication Data
US 2016/0337215 A1    Nov. 17, 2016

(51) Int. Cl.
*H04L 29/08* (2006.01)
*H04L 12/24* (2006.01)

(52) U.S. Cl.
CPC .......... *H04L 67/10* (2013.01); *H04L 41/5035* (2013.01); *H04L 41/22* (2013.01); *H04L 41/5096* (2013.01)

(58) Field of Classification Search
CPC .......... G06F 2201/865; G06F 2201/87; G06F 2201/875; G06F 11/3636; G06F 11/0709; G06F 11/3003; G06F 11/3006; G06F 17/30489
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

"Salesforce: Force.com Apex Code Developer's Guide", Ver 33.0, Feb. 6, 2015, 2120 pgs.

(Continued)

*Primary Examiner* — Tom Y Chang
(74) *Attorney, Agent, or Firm* — Sterne, Kessler, Goldstein & Fox P.L.L.C.

(57) ABSTRACT

The technology disclosed describes systems and methods for implementing global profiling to track resource usage and performance for multiple threads across multiple servers for a cloud-based system. This disclosed technology provides global profiling to track resource usage across any part of a transaction as it passes between layers of a computing stack regardless of the language being executed, on logically different virtual machines across multiple servers. After data collection stops, the disclosed technology combines the results into a configurable profile view that accurately represents the order of execution of applications and methods, as though they ran on one machine. The disclosed technology builds multiple formats of the data files for different display visualizations.

25 Claims, 16 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0210877 A1* | 10/2004 | Sluiman .............. H04L 67/22 <br> 717/130 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0172168 A1* | 8/2005 | Kilian ................ G06F 11/362 <br> 714/31 |
| 2006/0021019 A1 | 1/2006 | Hinton et al. |
| 2006/0155516 A1* | 7/2006 | Johnson ............. G06F 11/349 <br> 702/186 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0158454 A1* | 6/2012 | Saunders ........... G06Q 10/0635 <br> 705/7.28 |
| 2012/0233137 A1 | 9/2012 | Jakobson et al. |
| 2012/0290407 A1 | 11/2012 | Hubbard et al. |

(56) References Cited

U.S. PATENT DOCUMENTS

| | | | |
|---|---|---|---|
| 2013/0047169 A1* | 2/2013 | Gagliardi | G06F 11/3636 |
| | | | 719/317 |
| 2013/0212497 A1 | 8/2013 | Zelenko et al. | |
| 2013/0247216 A1 | 9/2013 | Cinarkaya et al. | |
| 2015/0120555 A1* | 4/2015 | Jung | G06Q 20/40 |
| | | | 705/44 |
| 2015/0222505 A1* | 8/2015 | Zmievski | G06Q 10/10 |
| | | | 709/224 |
| 2015/0319221 A1* | 11/2015 | Zmievski | G06Q 10/067 |
| | | | 709/202 |
| 2016/0283207 A1* | 9/2016 | Nandakumar | G06F 8/41 |
| 2017/0372246 A1* | 12/2017 | Storey | G06Q 10/06316 |

OTHER PUBLICATIONS

"Microsoft Azure: How to Deploy your First Windows Azure application", Dec. 4, 2014, 7 pgs. Retrieved from the Internet: <http://www.microsoft.com/bizspark/azure/howtodeployazureapp.aspx>.

* cited by examiner

Fig. 1 Multi-App Server Resource Usage Tracking Environment

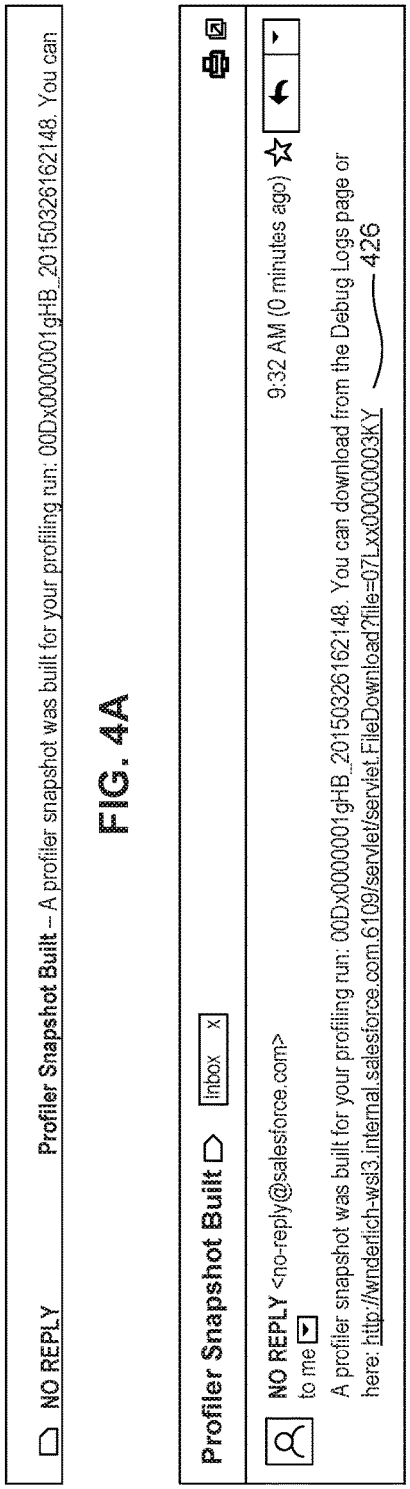

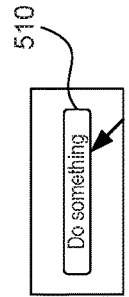

FIG. 5A

| Action | Name | Namespace Prefix | Api Version | Status | Size Without Comments | Last Modified By | Override Log Filters |
|---|---|---|---|---|---|---|---|
| Edit \| Del \| Security | DetailButtonController | 525 | 33.0 | Active | 662 | /wnderlich-wsl3_LastName, 11/3/2014 5:16 PM | ☐ |
| Edit \| Del \| Security | Expense Control | | 34.0 | Active | 359 | /wnderlich-wsl3_LastName, 12/10/2014 10:55 AM | ☐ |
| Edit \| Del \| Security | Factorial | /wunderlich | 33.0 | Active | 172 | /wnderlich-wsl3_LastName, 3/26/2015 9:26 AM | ☐ |
| Edit \| Security | Factorial2 | /wunderlich | 33.0 | Active | 173 | /wnderlich-wsl3_LastName, 11/17/2014 9:21 PM | ☐ |
| Edit \| Del \| Security | FactorialTestClass | | 33.0 | Active | 368 | /wnderlich-wsl3_LastName, 3/26/2015 9:17 AM | ☐ |
| Edit | FactorialTestClass | /wunderlich | 33.0 | Active | 232 | /wnderlich-wsl3_LastName, 11/17/2014 9:21 PM | ☐ |
| Edit \| Del \| Security | HelloWorldTestClass | | 33.0 | Active | 926 | /wnderlich-wsl3_LastName, 10/22/2014 10:44 AM | ☐ |
| Edit \| Del \| Security | MyHelloWorld | | 33.0 | Active | 156 | /wnderlich-wsl3_LastName, 10/22/2014 10:30 AM | ☐ |

Developer Console | New | Generate from WSDL | Run All Tests | Schedule Apex

FIG. 5B

Apex Class
DetailButtonController

« Back to List: Apex Classes

Apex Class Detail   [Edit] [Delete] [Download] [Security] [Show Dependencies]

Name  DetailButtonController
Namespace Prefix
Created By  /wnderlich-wsl3 LastName, 11/3/2014 5:16 PM

| Class Body | Class Summary | Version Settings | Log Filters |

```
1  public with sharing class DetailButtonController
2  {
3      private ApexPages.StandardController standardController;
4
5      public DetailButtonController(ApexPages.StandardController standardController)
6      {
7          this.standardController = standardController;
8      }
9
10     public PageReference doSomething()            ⟵ 625
11     {
12         // Apex code for handling record from a Detail page goes here
13         Id recordId = standardController.getId();
14         Book__c record = (Book__c) standardController.getRecord()
15         Decimal I = record.Factorial_I_int__c;
16         if ( I > 0 ) {
17             Decimal value = Factorial.fac(I.intValue());   ⟵ 635
18             record.Factorial_Value__c = value;
19             update record;
20         }
21         return null;
22     }
23 }
```

FIG. 6

Profiling

Start Profiling

No profiling is currently active
Profiling Filter (*, a userID, or a class ID)

☐ Collect CPU Time

Debug Logs 1422

Delete All 1425

| | User | Request Type | Application | Operation | Status | Duration | Log Size (bytes) | Start Time |
|---|---|---|---|---|---|---|---|---|
| View\|Download\|Delete | /wnderlich-wsl3_LastName | Profiling | Profiler | 00Dxx0000001gHB_20150326162148 | Success | 226,687 | 2,931 | 03/26 09:25:59 |
| View\|Download\|Delete | /wnderlich-wsl3_LastName | Api | Unknown | ApexTestHandler | Success | 435 | 4,067 | 03/18 16:54:00 |
| View\|Download\|Delete | /wnderlich-wsl3_LastName | Application | Browser | /setup/build/editApexClass.apexp | Success | 1,766 | 976 | 03/18 16:53:50 |
| View\|Download\|Delete | /wnderlich-wsl3_LastName | Application | Browser | /setup/build/editApexClass.apexp | Success | 1,701 | 349 | 03/18 16:53:39 |
| View\|Download\|Delete | /wnderlich-wsl3_LastName | Profiling | Profiler | 00Dxx0000001gHB_20150310221555 | Success | 1,022 | 1,326 | 03/10 15:16:21 |
| View\|Download\|Delete | /wnderlich-wsl3_LastName | Profiling | Profiler | 00Dxx0000001gHB_20150113015202 | Success | 4,074 | 1,318 | 01/12 17:52:41 |
| View\|Download\|Delete | /wnderlich-wsl3_LastName | Profiling | Profiler | 00Dxx0000001gHB_20150109171246 | Success | 4,159 | 3,485 | 01/09 09:14:14 |

1426

Previous Page | Next Page

Delete All

FIG. 14

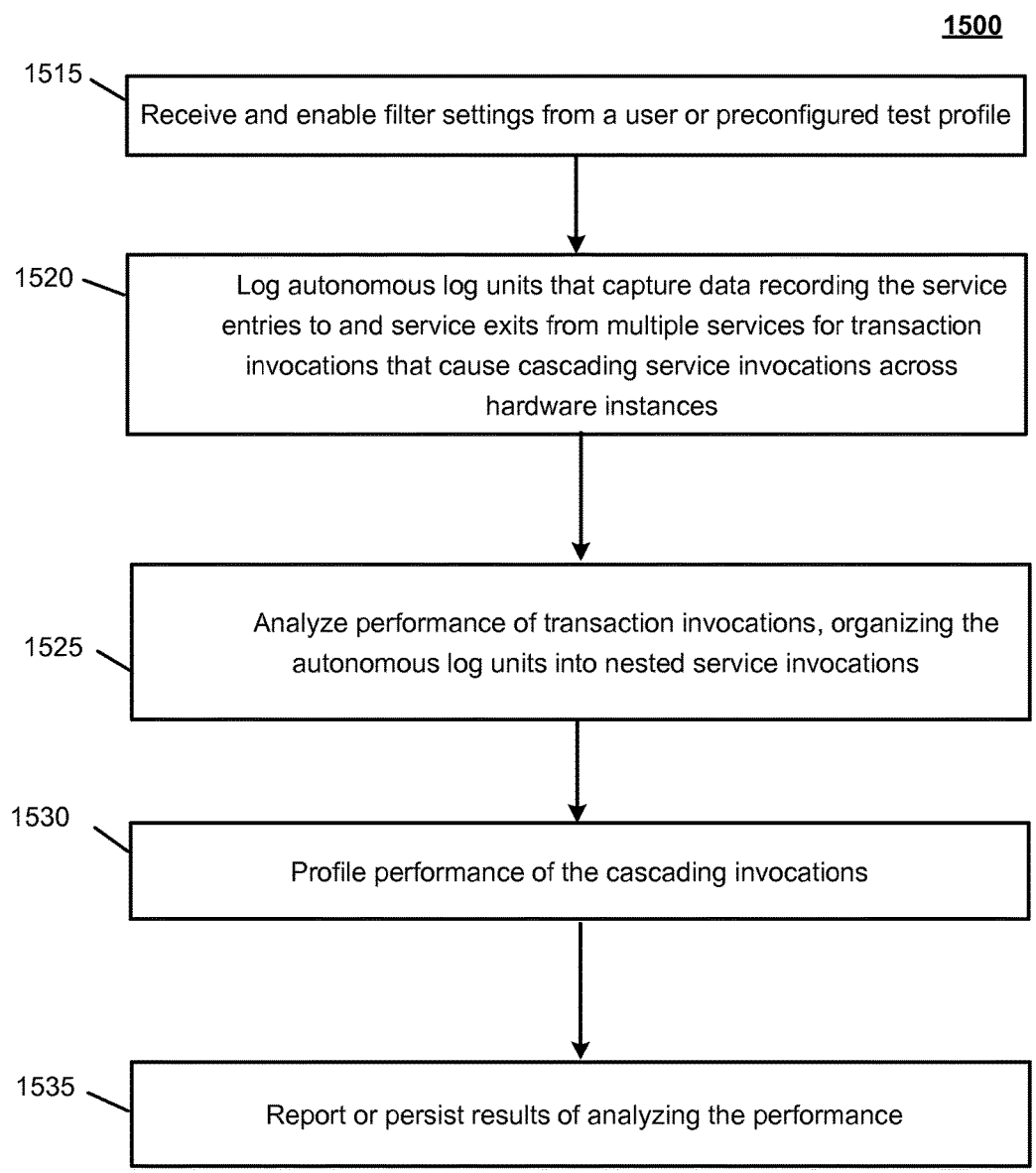
FIG. 15 Workflow

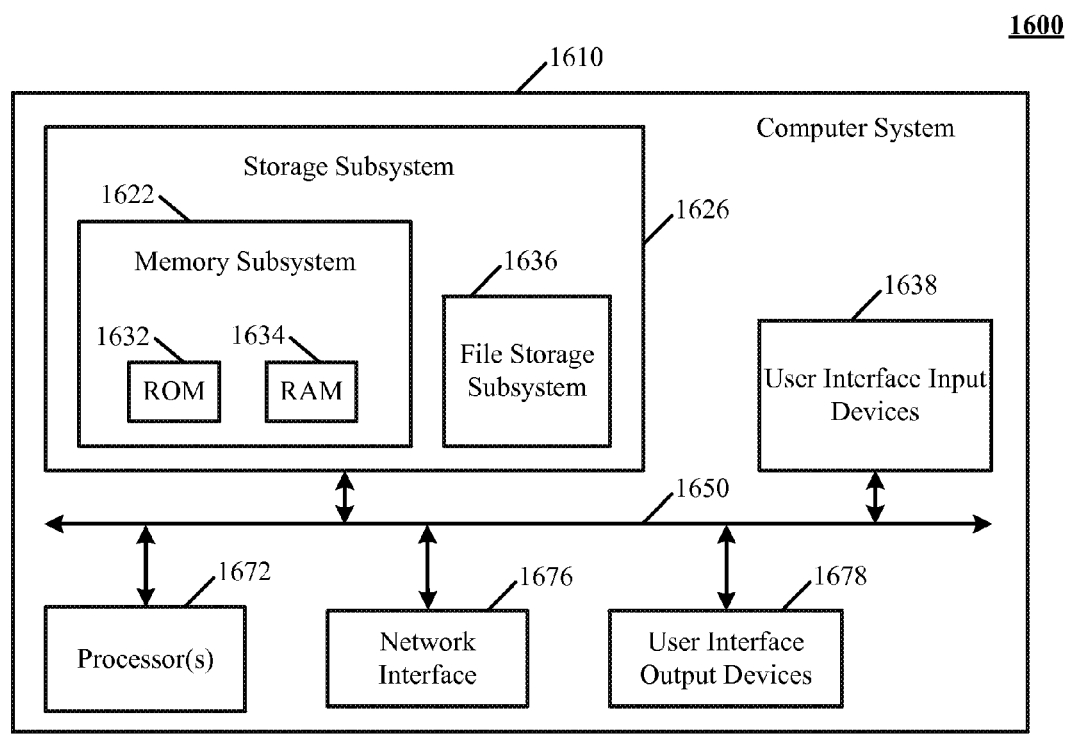
FIG. 16 Computer System

US 10,397,309 B2

SYSTEMS AND METHODS OF IMPLEMENTING TRACKING OF RESOURCE USAGE FOR A CLOUD-BASED SYSTEM

INTRODUCTION

The technology disclosed describes systems and methods for implementing global profiling to track resource usage and performance for multiple threads across multiple servers for a cloud-based system. This disclosed technology provides global profiling to track resource usage across any part of a transaction as it passes between layers of a computing stack regardless of the language being executed, on logically different virtual machines across multiple servers. After data collection stops, the disclosed technology combines the results into a configurable profile view that accurately represents the order of execution of applications and methods, as though they ran on one machine. The disclosed technology builds multiple formats of the data files for different display visualizations.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 4A is an example of an email of a profiler snapshot built notification.

FIG. 4B is an example of the contents of an email for a profiler snapshot built notification.

FIG. 4C is an example of a logs user interface.

FIG. 5A is an example Do Something button.

FIG. 5B is an example of a log showing an active detail button controller.

FIG. 6 shows class details of a detail button controller.

FIG. 14 shows a logs UI with view, download and delete options for log files.

FIG. 15 shows an example workflow for a multi-app profiler.

FIG. 16 an example computer system used for multi-app resource usage tracking.

DETAILED DESCRIPTION

Figure 1:
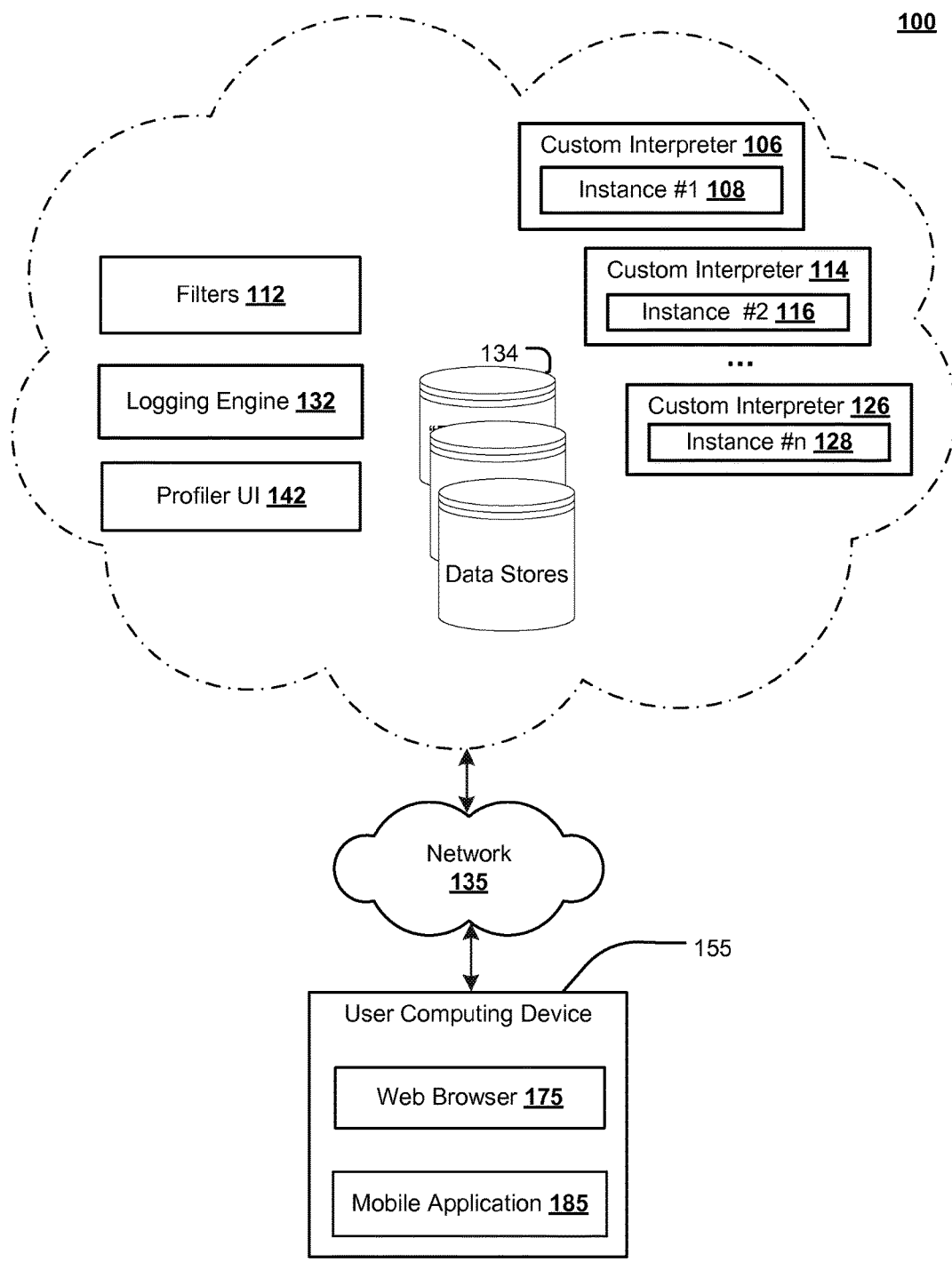
FIG. 1 illustrates one implementation of a multi-app server resource usage tracking environment.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Cloud computing refers to a set of services that provide companies and application developers with the means to scale their application's resource usage through the Internet on demand. For example, developers can build applications on Amazon Web Services, Google App Engine and Microsoft Windows Azure.

A platform as a service (PaaS) is a category of cloud computing services that provides a platform allowing customers to develop, run and manage Web applications without the complexity of building and maintaining the infrastructure typically associated with developing and launching an app. A CRM is an example category of service that is deliverable as a PaaS. CRMs combine business processes and technology to organize, automate, and synchronize sales, marketing, customer service, and technical support, providing a platform for managing a company's interactions with current and future customers, to achieve the goal of getting and keeping the customers. A PaaS can be delivered as a public cloud service from a provider, where the consumer can control some software deployment and configuration settings, and the provider provides the networks, servers, storage, and core software services to host the consumer's customized application. Microsoft Azure is an example of a cloud computing platform and infrastructure, for building, deploying and managing applications and services. Force.com is another example PaaS a platform provided as a service to developers, with applications built using a proprietary Java-like programming language and an XML syntax that allows developers to create multitenant add-on applications that integrate into Salesforce.com applications, and are hosted on SFDC infrastructure.

When users at multiple organizations simultaneously make use of a cloud-based CRM or other PaaS, each user interacts with a separate logical instance. These stateless instances run independently on multiple servers that hold no record of previous instances or interactions. Each user instance gets handled based entirely on information included with the invocation. Due to multi-tenancy, multiple app servers participate in activities for an organization. One app server knows nothing about another app server. We must log data independently and post-process it to come up with a version that looks like it is a single cloud. Service users do not care about app service.

A tool called a profiler can perform a form of dynamic program analysis that measures the time complexity of a program, the usage of particular instructions, and the frequency and duration of function and method calls. This information aids developers as they debug and optimize programs. Historically profilers have collected data on an app server basis or across multiple servers, from an external viewpoint. This approach has limitations, as events get out of sequence in the logs due to the presence of multiple threads across multiple servers.

Developers who build and support applications that run on multi-user cloud-based software platforms need to be able to track resource usage across multiple invocations of controllers for different users across diverse organizations on multiple app servers. To discover problems, programmers need a cloud view perspective across the many threads of code combining the multiple instances into a single profile view so that the instances appear to have run on one machine.

The disclosed technology provides global profiling to track resource usage and performance across any part of a transaction as it passes between layers of a computing stack regardless of the language being executed on logically different virtual machines across multiple servers. After data collection stops, the disclosed technology combines the results into a configurable profile view that accurately represents the order of execution of applications and methods, as though they all ran on one machine building multiple formats of the data files for different display visualizations.

Profiling Environment

FIG. 1 illustrates one implementation of a multi-app server profiling environment 100 that includes filters 112, logging engine 132, data stores 134, profiler user interface 142 and a network 135. Millions of instances across multiple app servers can run asynchronously and independently of each other in the cloud. In the example shown in FIG. 1, instance #1 108 is wrapped by custom interpreter 106, instance #2 116 is wrapped by custom interpreter 114, and instance #n 128 is wrapped by custom interpreter 126. At a snapshot in time, instance #1 108 could be a Contacts entry form for customer A at organization A; instance #2 116 could be a Leads summary page for customer B in organization B; and instance #n 128 could be an Accounts log for customer C, at organization B.

Filters 112 specify what is to be profiled; that is, they control a scope of profiling of service entry and service exit data across multiple services running on multiple hardware instances. The function of filtering is to reduce the load on the server by reducing the generation of events. A profile request can specify capture all events for a specific time span, or can filter for a single user (userID, also called user identifier), for one method or class (classID, also called class identifier), or for an organization (organization ID), or some combination of the filter options.

Logging engine 132 collects data for an instance and stores the data in high speed data stores 134, with a one-to-one mapping between instance and data store. That is, the data for a single instance is stored separately from the data for a different instance. Profiler UI 142 includes entry of filter options for a profile, and can display reports of data logged during the profiling time window, as described later. In an alternative implementation filter settings could be provided by a pre-configured test profile.

Multi-app server profiling environment 100 further includes a user computing device 155 with a web browser 175 and a mobile application 185. In other implementations, environment 100 may not have the same elements as those listed above and/or may have other/different elements instead of, or in addition to, those listed above.

In some implementations, the modules of multi-app server profiling environment 100 can be of varying types including workstations, servers, computing clusters, blade servers, server farms, or any other data processing systems or computing devices. Modules can be communicably coupled to the data store via a different network connection. For example, logging engine 132 can be coupled to a direct network link. In some implementations, it may be connected via a WiFi hotspot.

In some implementations, network(s) 135 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

User computing device 155 includes a web browser 175 and/or a mobile application 185. In some implementations, user computing device 155 can be a personal computer, laptop computer, tablet computer, smartphone, personal digital assistant (PDA), digital image capture devices, and the like.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

For a platform as a service (PaaS) environment and for software as a service, the source code is maintained on servers and the compilation and runtime aspects are managed for users on the servers. For the disclosed technology, when a profiler request is activated, the request is mapped to the source code instance. That source code is compiled, and generated code is loaded into custom interpreters 106, 114 and 126 on the multi-app servers. These custom interpreters serve as wrappers for three example instances across multiple app servers. For example, custom interpreters 106, 114 and 126 may specify filters that capture profiling data for all events that make use of a particular class, and for events for a specific organization, such as Amazon. These wrappers also typically include service protection that ensures data privacy for users. In one example, an existing CRM source code wrapper for a CRM can be extended to allow capture of profiling data for a specific user (in our example, Amazon) during execution. The profiler process recognizes profiler requests and knows how to intercept method calls and attach the profiler to each request.

Governor limits are typically enforced for a runtime engine in a multitenant environment, to ensure that runaway code does not monopolize shared resources. These limits apply to each code transaction. For example, maximum CPU time on Salesforce servers for a synchronous process is 10,000 ms and the asynchronous limit is 60,000 ms. Inside the custom interpreters 106, 114 and 126, the service provider has full control over the execution of the code and can use that control to enforce governor limits and ensure isolation between users at an organization and between organizations.

Certain contents in a multi-tenant environment may optionally be obfuscated to the user. For instance, a system operator or application developers may hide protected code from users. This can include private libraries provided by independent software vendors and protected under IP laws. A profiler can be configurable so that a user is unable to inspect the contents of those libraries. In short, it can be useful to obfuscate a blacklist of content to hide protected code.

In some profiling systems, users receive a full view of everything that has been executed because, as the owner of the system, the user has rights to everything running. For a multi-tenant or hosted environment for a cloud-based system, the profiler can optionally anonymize code to be hidden. Application developers and customers can share code with other customers via a mechanism called managed packages. Selected code in the managed packages can be hidden and the user can access only certain parts of it, due to intellectual property security requirements—so that users cannot reverse engineer the code. Customer A, who developed a managed package, may share it with Customer B. When Customer B uses the profiler, Customer B need not be able to see how the managed package works through its method entries/exits. In addition, code for certain system-level methods, implemented as part of the core platform for a multi-tenant system, can be anonymized to users. Both individual customers and system level developers can track resource usage in a cloud based system, while sensitive code is anonymized to users. An example of the nesting of hidden methods is shown below:

```
visible method entry [should be visible]
    hidden method #1 entry [should not be visible]
        hidden method #2 entry [should not be visible]
        hidden method #2 exit [should not be visible]
    hidden method #1 exit [should not be visible]
visible method exit [should be visible]
```

Similarly, the host's system code can include hidden methods. A scope of profile reporting can be limited by an option to mark a service or class as a terminal profiling level. A terminal profiling level mark can include hiding the code for child services or classes invoked by the marked service or class, when reporting the results of analyzing the performance.

Profiling is a request-based system. In one implementation, an application developer enables profiling via the profiler UI 142 setting filters 112 to capture data for users, organizations and classes of interest. The custom interpreter stores the profile filter 112 specified by the developer for every instance currently active in the cloud.

Figure 2:
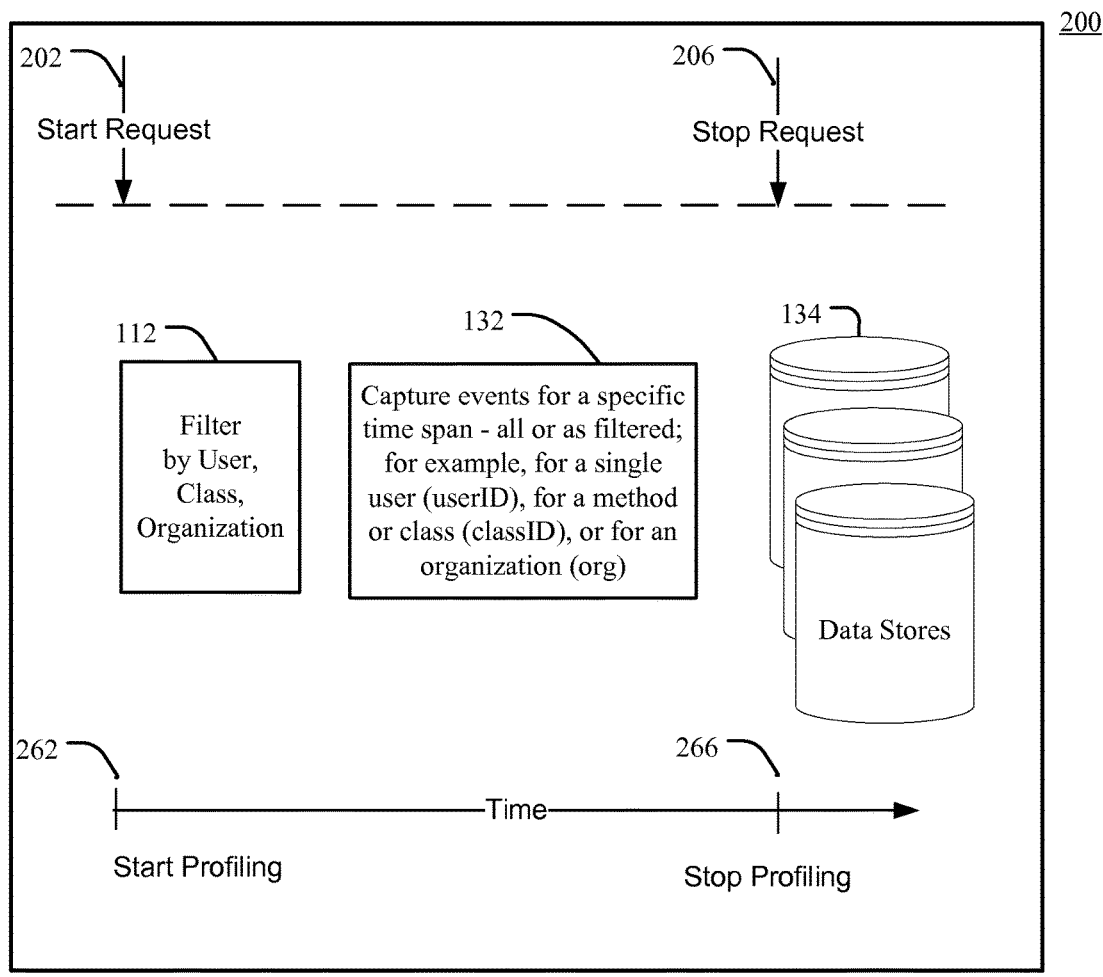
FIG. 2 shows an example of profiling request timing.

When a start request 202 triggers start profiling 262, in FIG. 2, the logging engine 132 captures events as they occur—web services requests and events that handle triggers on objects-across the active instances. The captured data includes event boundary entry and exits, and profiles of the parts of the transactions as they pass between layers of the computing stack, regardless of the language being executed. Autonomous log units capture data from the service invocation wrappers that wrap the multiple services. The captured data includes a transaction ID that spans services and classes, and functions and methods invoked by the transaction invocation. The transaction invocation URI for the service, a class/function/method identifier, and time stamps of the service entries and the service exits are captured and stored in data stores 134. A stop request 206 causes the logger to stop profiling 266 across the instances. Time stamps of the service entries and service exits are used to calculate elapsed time, since one transaction runs on one app server. We use time clock values provided by the app server to determine elapsed time.

Developers are often interested in specific code—in a class or method that updates something—and they can enter and exit the code while a profiler is active and later view the results of the code compile sequence. Code typically implements a group of nested classes-entering and then exiting each method, as shown below:

```
Entry
    Entry
        Entry
            Entry
                Exit
            Exit
        Exit
    Exit
```

The entry and exit points are wrapped via custom interpreters that are configured based on the filter choices entered by the developer via the profiler UI 142. The developer can profile a complete request, including the act of interpreting or compiling code, and/or the act of interacting with the profiler UI 142. For example, a transaction might start, and before the developer executes code that is being profiled, they can see that the optional compiler was run and how long it took to run. This captured data includes multiple data points to assist in solving execution problems.

Figure 3A:
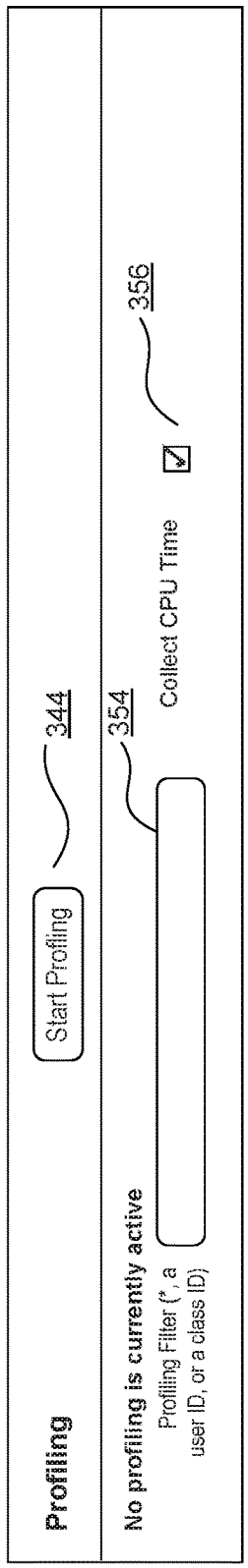
FIG. 3A is an example of a UI for starting profiling.
Figure 3B:
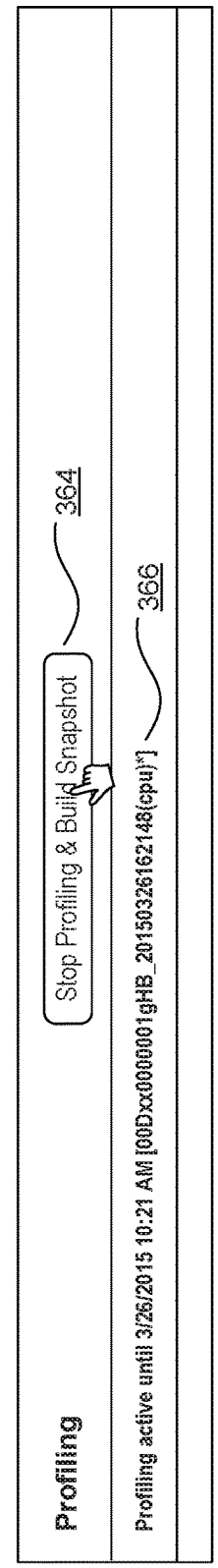
FIG. 3B is an example of a UI for stopping profiling.

FIG. 3A shows an example profiler UI 142, including a start profiling button 344, a field for specifying a profiling filter 354, and a field for selecting whether to collect CPU time 356. Clock time is always collected; it is a developer option to collect CPU time. If we only need instance counts and clock time, then we can elect to not collect CPU time. When collect CPU time is not selected, profiler overhead is reduced. Stop profiling and build snapshot button 364 is shown in FIG. 3B, with an example status of a profile capture in progress 366. In some implementations, a filter for a minimum elapsed time would profile only long running transactions. In other implementations, a filter for a URI could initiate profiling of a particular service request.

Selection of the start profiling button 344 signals the beginning of logging of autonomous log units across the hardware instances, responsive to the filters. The autonomous log units capture data that records the service entries to and service exits from the multiple services. When the profiler stops logging, it spins off an asynchronous job and the overhead events stop. Due to concerns about overhead, the profiler can be configured run for up to a maximum of one hour by default. This feature ensures that no one will start the profiler and walk away, leaving it running indefinitely.

Log entries persist as individual autonomous log units in data stores 134, outside of the working memory of the app servers. To reduce the server load during profiling, low level wrapper and background thread wrapper functionality are implemented to provide context, in a layer in which the user is not involved.

Consider the following example for viewing profiler results. The developer selects start profiling button 344, and then clicks the "do something" button 510 in FIG. 5A. In the log in FIG. 5B, the developer clicks on the DetailButtonController 525 class to view the button controller class and the handler for doSomething method 625 in FIG. 6. Note the call in the detail button controller class to a factorial method 635, and the recursive call structure in the factorial code example shown below.

```
global class Factorial {
    global static integer fac(integer i) {
        if (i == 0) return 0;
        if (i == 1) return 1;
        return fac(i-1) + fac(i-2);
    }
}
```

The developer then selects the stop profiling and build snapshot button 364 in FIG. 3B and reviews the use of computer resources during the period profiled. In an alternative implementation, a profiler could be scheduled to start and stop at times entered into a profiler UI field, or could be scheduled to start at a specific time and run for a set duration.

During the execution of transactions, the custom interpreters determine whether entry and exits at a boundary are to be collected. At the end of the transaction we have a long list of entry and exits. A sample log segment of autonomous log units captured across the hardware instances, using at least transaction ID to organize the autonomous log units into nested service invocations with reentrant calls (time, entry/exit and boundary/method name) is shown below. Note the logging of the compiler time, which is not part of the code.

```
181694375|ENTRY|Complile Factorial.apex
181696271|EXIT |Complile Factorial.apex
181696277|ENTRY|Factorial.Factorial( )
181753616|EXIT |Factorial.Factorial( )
181959064|ENTRY|Factorial.fac(Integer)
    182771171|ENTRY|Factorial.fac(Integer)
        182980945|ENTRY|Factorial.fac(Integer)
            183133696|ENTRY|Factorial.fac(Integer)
                183291068|ENTRY|Factorial.fac(Integer)
                183513985|EXIT |Factorial.fac(Integer)
                183628514|ENTRY|Factorial.fac(Integer)
                183763596|EXIT |Factorial.fac(Integer)
            183870598|EXIT |Factorial.fac(Integer)
            183980195|ENTRY|Factorial.fac(Integer)
            184155279|EXIT |Factorial.fac(Integer)
        184247384|EXIT |Factorial.fac(Integer)
        184339852|ENTRY|Factorial.fac(Integer)
            184490335|ENTRY|Factorial.fac(Integer)
            184633303|EXIT |Factorial.fac(Integer)
        184949169|EXIT |Factorial.fac(Integer)
    185031835|EXIT |Factorial.fac(Integer)
    185121795|ENTRY|Factorial.fac(Integer)
        185266707|ENTRY|Factorial.fac(Integer)
            185416478|ENTRY|Factorial.fac(Integer)
            185559981|EXIT |Factorial.fac(Integer)
            185657409|ENTRY|Factorial.fac(Integer)
            185786149|EXIT |Factorial.fac(Integer)
        185875205|EXIT |Factorial.fac(Integer)
```

At the end of the transaction, a background job adds context to the collected raw data points and forms a complex object that is then passed to another thread to store. An example, using unique transaction ID to organize the autonomous log units into nested service invocations, is listed below.

```
Unique Transaction ID: 12321454325.1232515314.124ABSDFA.132341
Start Time: 181691211
End Time: 186268367
Request: /test/FactorialText
Application: API
User: jadmin
App Server: sfdc1-01-03b
Thread: jvm01-appliationThread001
Entries (from sample log segment shown above):
    ...
    181694375|ENTRY|Complile Factorial.apex
    181696271|EXIT |Complile Factorial.apex
    181696277|ENTRY|Factorial.Factorial( )
    181753616|EXIT |Factorial.Factorial( )
    181959064|ENTRY|Factorial.fac(Integer)
        182771171|ENTRY|Factorial.fac(Integer)
        ...
        186189658|EXIT |Factorial.fac(Integer)
    186266754|EXIT |Factorial.fac(Integer)
    ...
```

After raw data collection stops, a background job collects the stored logs. Then various views can be built by pivoting on any of the contextual information that was added, and analyzing performance of transaction invocations that cause cascading service invocations services. The autonomous log units captured across the hardware instances are organized, and profile performance of the cascading invocations can be analyzed. A snippet of one format for the output in user logs for developers is shown below.

```
....
16:54:00.187
(187780907)|SYSTEM_METHOD_ENTRY|[5]|String.valueOf(Object)
16:54:00.188
(188093728)|SYSTEM_METHOD_EXIT|[5]|String.valueOf(Object)
16:54:00.188
(188414754)|SYSTEM_METHOD_ENTRY|[5]|System.debug(ANY)
16:54:00.188
(188591173)|USER_DEBUG|[5]|DEBUG|Factorial Limit 5: 5
16:54:00.188
(188731285)|PROFILER_HOT_SPOTS_TOP5|
    Factorial.fac( ) 177 invocations, 34.4ms (67.8%)
    FactorialTestClass.validateFactorial( ) 1 invocation, 3.44 ms (31%)
    StringMethods.valueOf( ) 1 invocation, 0.26 ms (0.5%)
    System.debug( ) 1 invocation, 0.11 ms (0.2%)
    Boolean.<init>( ) 2 invocations, 0.09 ms (0.2%)
16:54:00.188 (188790202)|CODE_UNIT_FINISHED|FactorialTestClass.
validateFactorial
16:54:00.190 (190772927)|EXECUTION_FINISHED
    ...
```

The disclosed technology includes using multiple formats of the logged data files for different display visualizations, and for reporting or persisting results of analyzing the performance. Developers can review profile reports and pinpoint problem code, or optimize code segments for more efficient functionality.

Continuing with our example, a generated email, in FIG. 4A, communicates that a profiler snapshot has been built, and the email contents (FIG. 4B) include a URL 426 that specifies the link to a logs page from which the developer can download the collected data. The logs screen in FIG. 4C, when refreshed, shows profiling results, including duration (ms) 226,687 ms 466 (3.78 minutes) of the profile, and the start time of the profiling request 468. To view the profiler snapshot, the developer selects the download option 462 on the logs screen to download the binary data and display a data profile using a profile viewer such as NetBeans Profiler.

Binary data that has been downloaded can be viewed in multiple formats. When the logger collects data, it adds contextual information so it is possible to pivot on any of the data. Data views can be combined after profiling, when creating call graphs. The profiler starts with app servers and threads, and reorganizes (pivots) the data against any filter type for which data was collected, and outputs a cloud-friendly view of the world.

Figure 7:
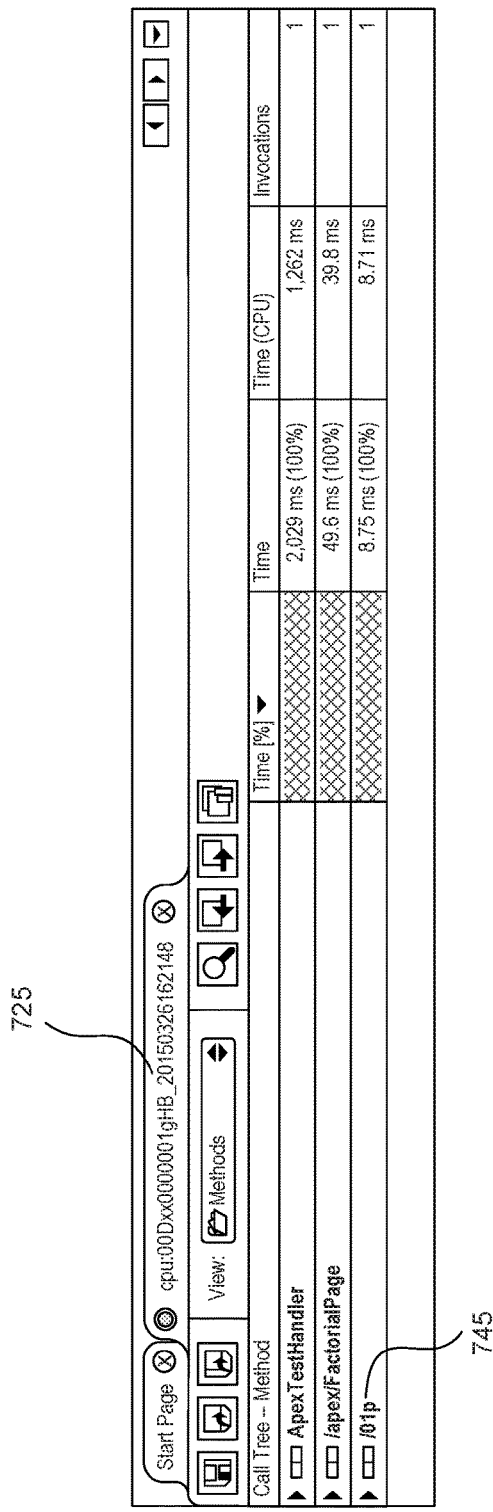
FIG. 7 is an example of a VisualVM view of a captured profile.
Figure 8A:
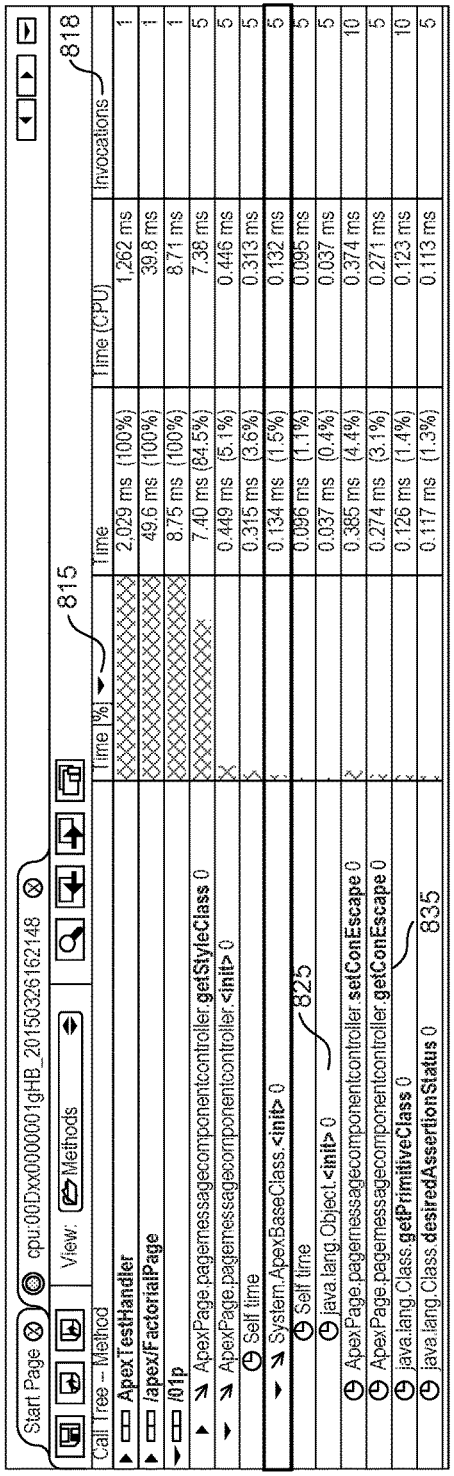
FIG. 8A shows drill down details for an edit button.

Visual VM is one of several tools for viewing detailed information about Java technology-based applications; NetBeans and Eclipse Proflier are two additional examples of viewing tools. FIG. 7 shows a captured profile using a VisualVM view of the downloaded binary log file. In this case, by default we pivot on transaction type—the URI of the transaction 725. In this example, 01P 745 represents time spent editing the "do something" page. FIG. 8A shows details when we drill down into the 01P edit button. The detail does not go very far because the code threw an error, as shown by calls to setConEscape 825 and getConEscape 835.

Figure 8B:
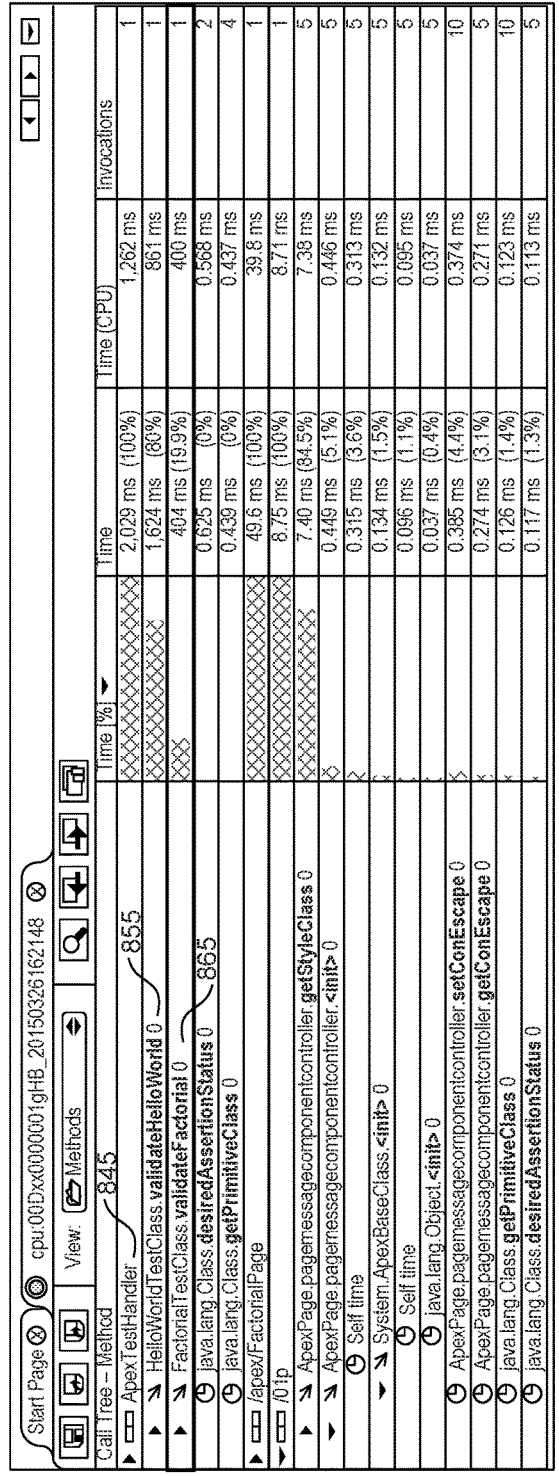
FIG. 8B shows drill down details for a test handler.
Figure 9:
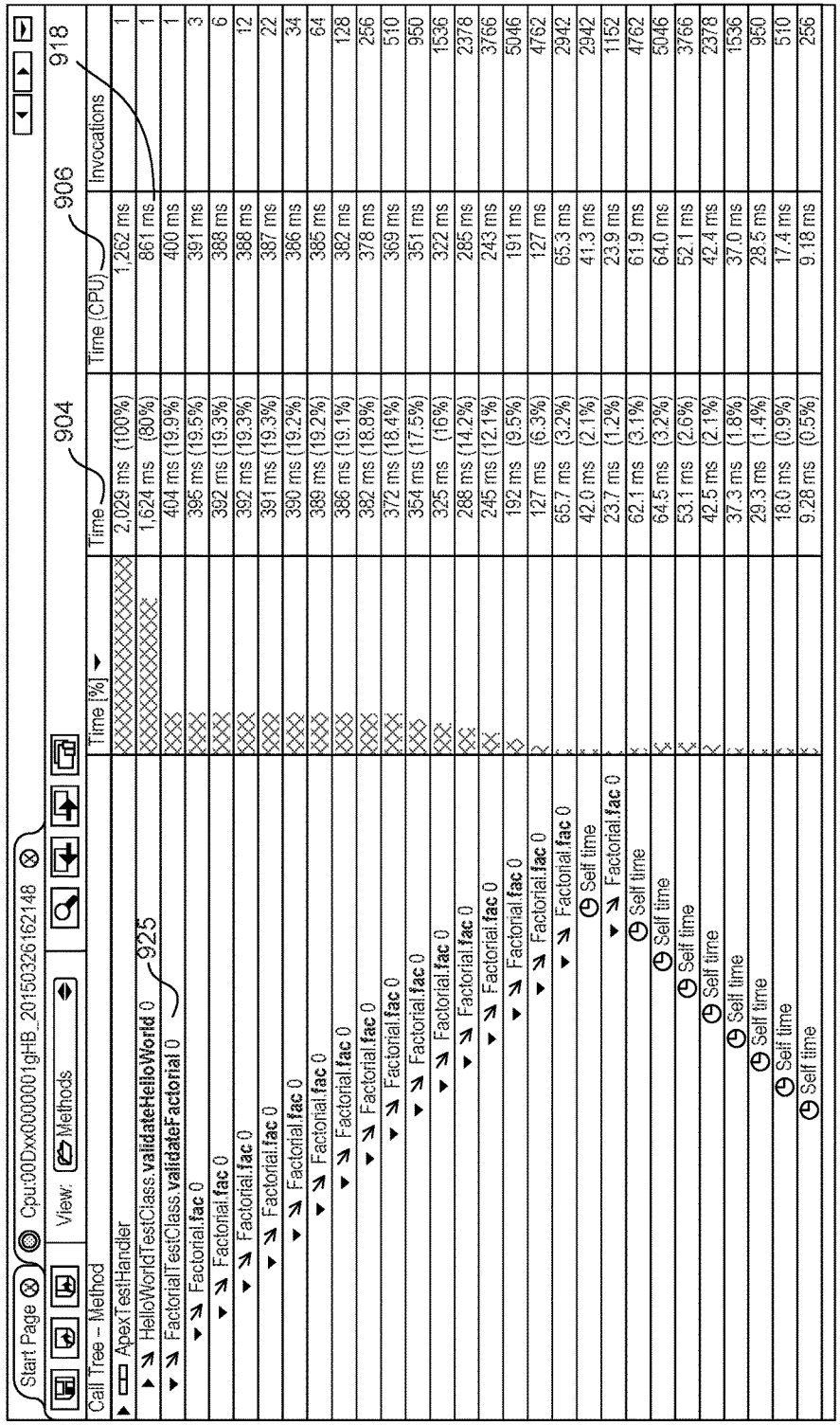
FIG. 9 shows drill down results for a factorial class.

The call tree view includes the percentage of time spent in each transaction 815, and the number of invocations 818 of a class. FIG. 8B shows details when we drill down into ApexTestHandler 845, showing the two tests that were run: validateHelloWorld 855 and validateFactorial 865. FIG. 9 shows results of drilling down in validateFactorial 865, with clock times 904 and CPU times 906. Note the nested recursive calls to factorial that were noted above. For Hello World class (a database call); the 861 ms CPU time 918 was half of the total instance time of 1,624 ms.

Figure 10:
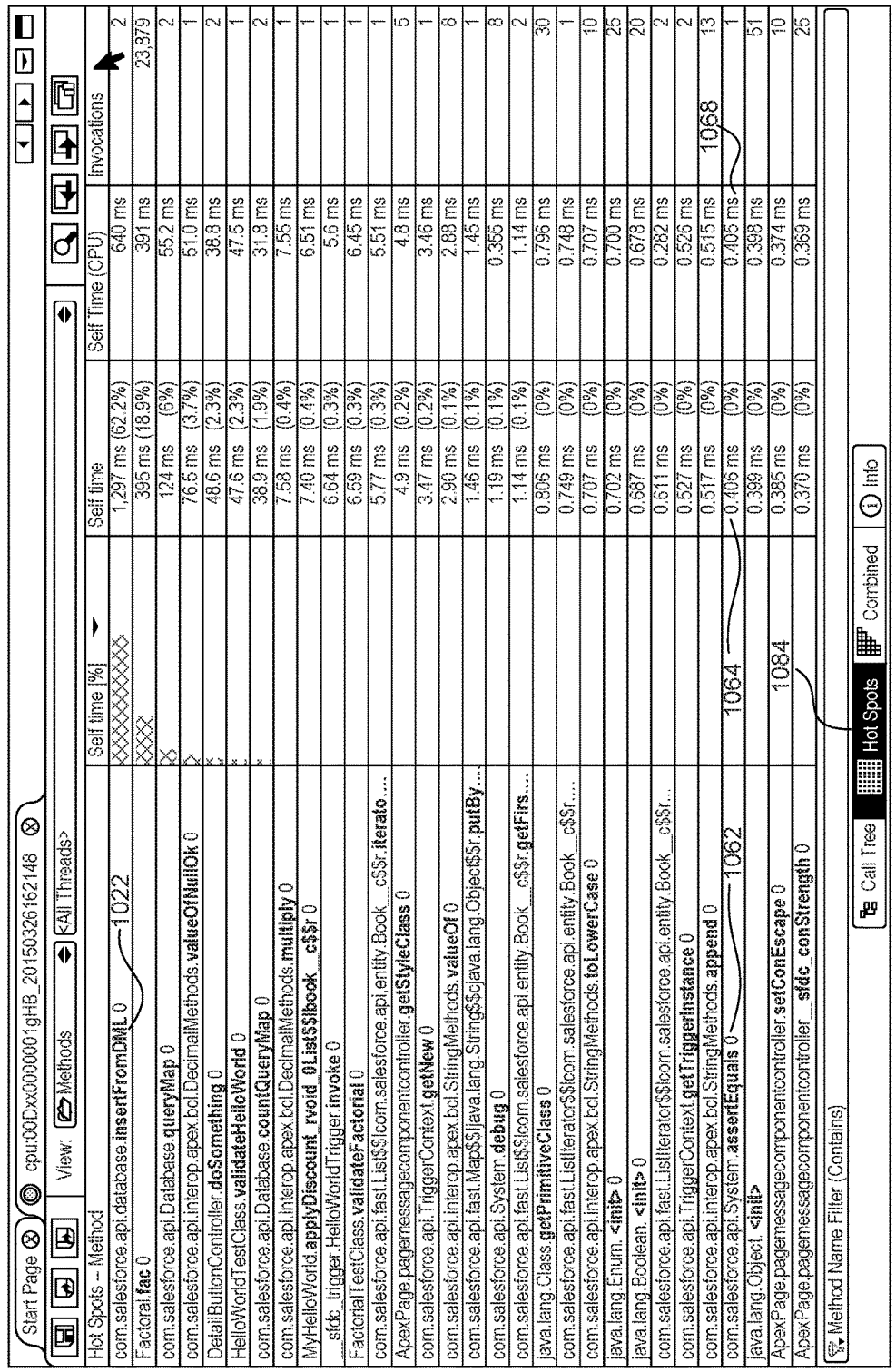
FIG. 10 is an example screen for hot spots for a profiling snapshot.
Figure 11:
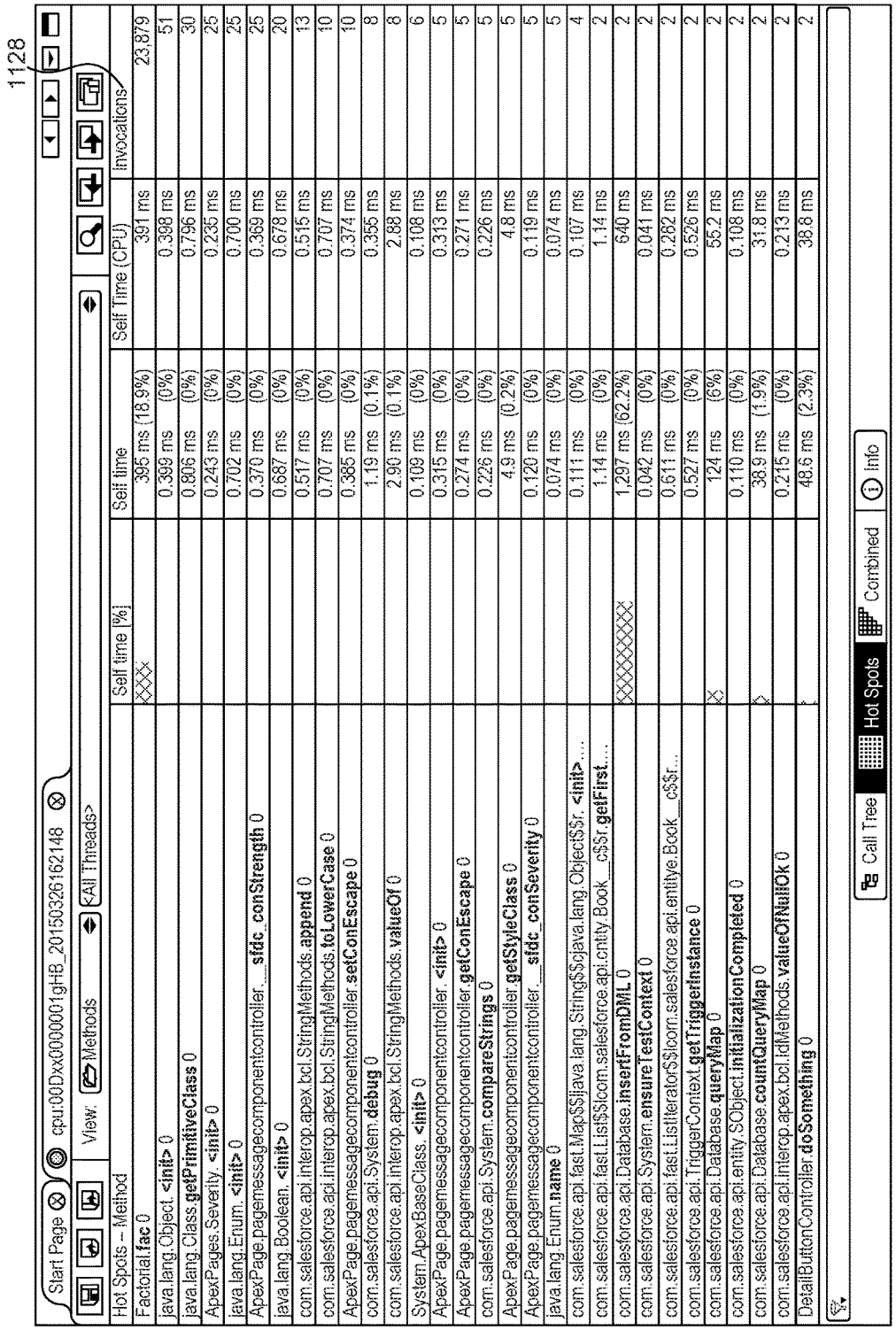
FIG. 11 is a view of hot spots sorted by number of invocations.

Hot spots are regions in an application where a high proportion of executed instructions occur or where most time is spent during the application's execution. FIG. 10 is a view of hot spots 1084 with invocations sorted in order of percentage of time of the total time used. That is, where did you spend most of your time? We can see that InsertFromDML 1022 used the most time during this profile snapshot. It is also of interest to note details for the assertEquals call 1062 in FIG. 10. The CPU time 1066 is almost identical (0.405 ms) to instance call time 1064 (0.406 ms); the method consumes almost pure computing power. FIG. 11 is a view of hot spots sorted by number of invocations. The factorial class was called 23,879 times 1128; the factorial method was called so many times because it uses a big key (20 factorial) and re-enters the factorial class. Factorial is a useful test class because it makes a lot of calls including calling itself, and generates a lot of data.

Figure 12:
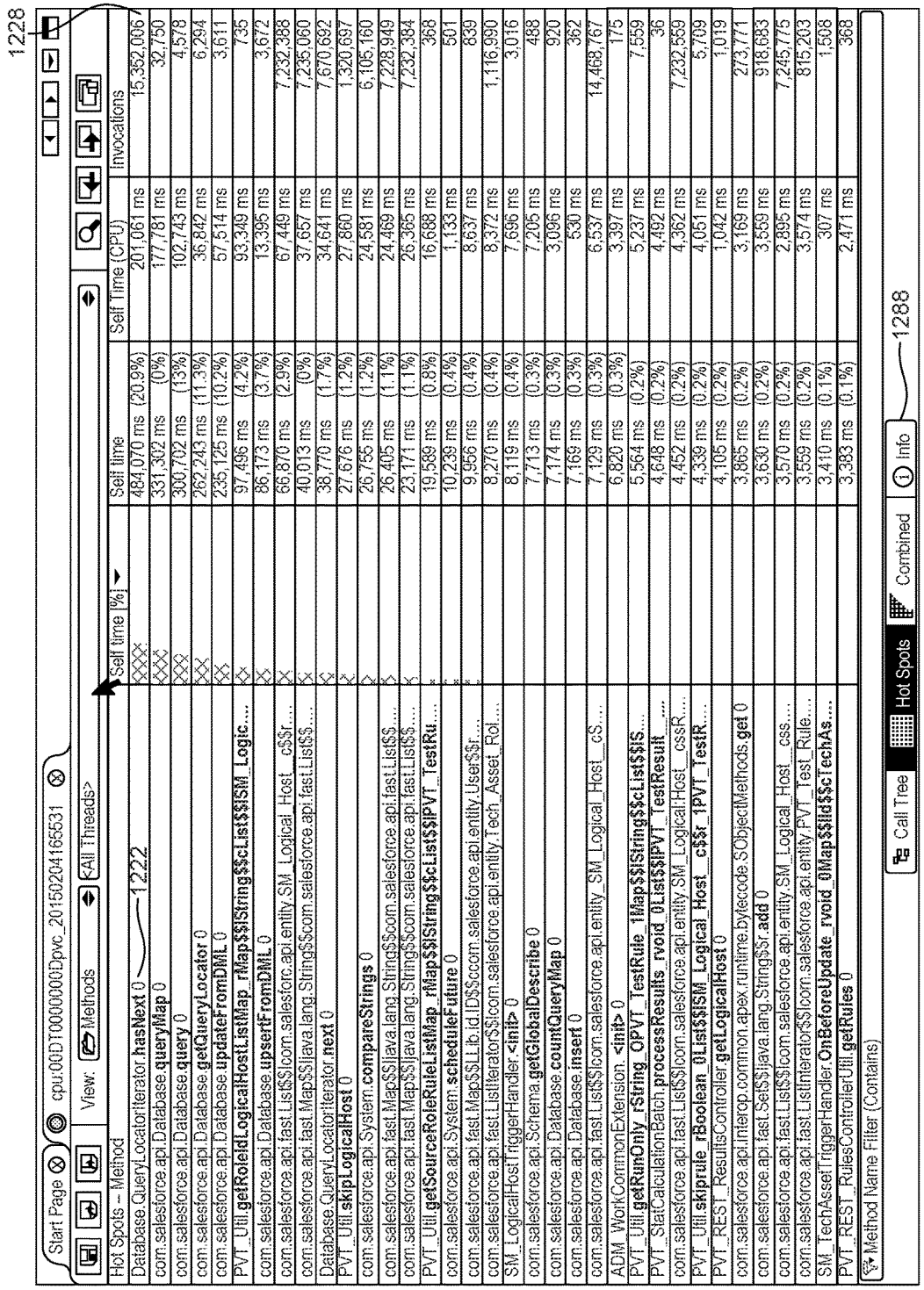
FIG. 12 shows hot spot details for a class with millions of invocations.
Figure 13:
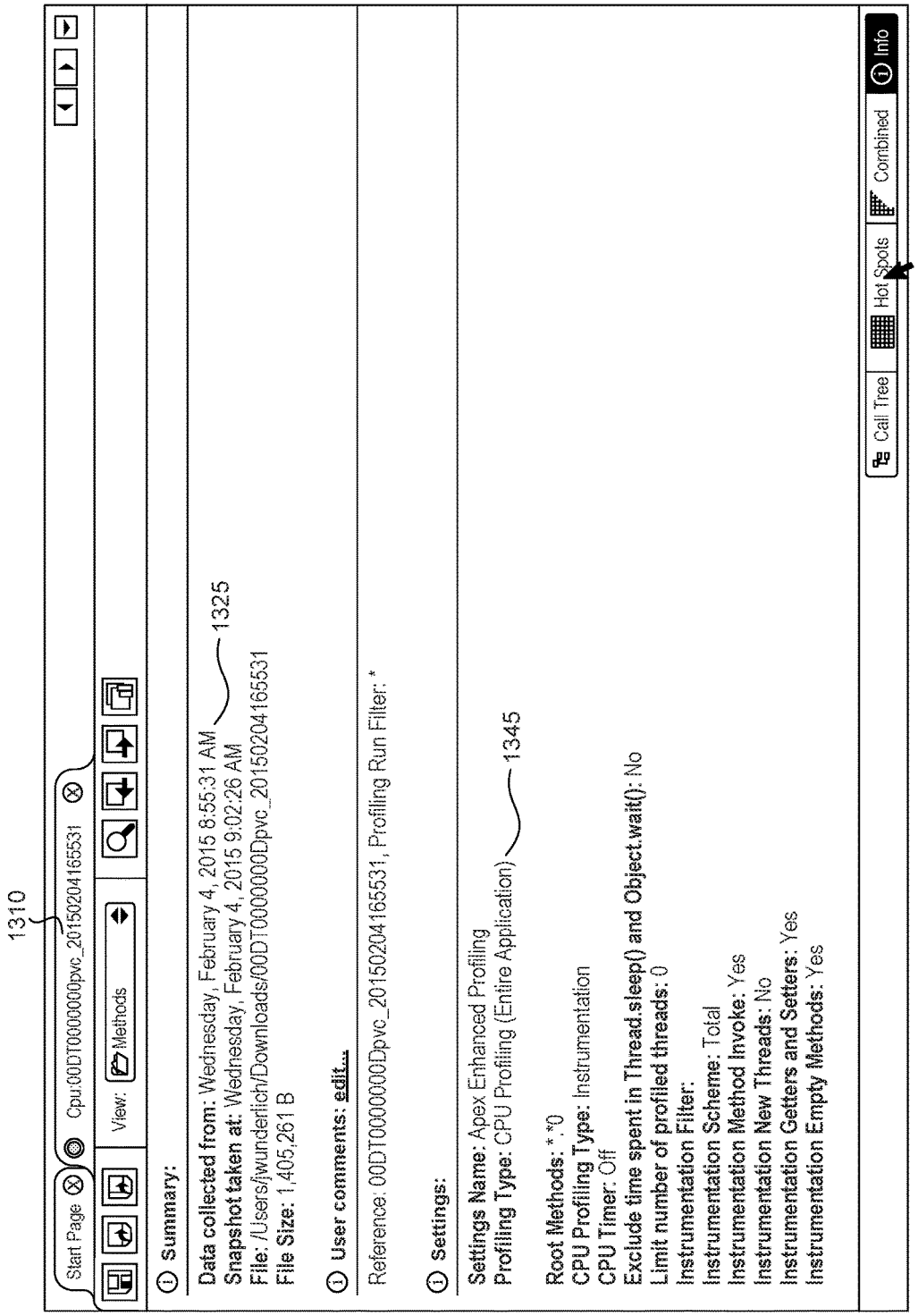
FIG. 13 is an example of info for a selected profiler snapshot.

The disclosed profiler offers perspective across threads of code, making it possible to discover problems in the cloud view. In the next example, developers wanted to discover why everything was going slowly, so profiled an active system for 8 minutes. In FIG. 12, in a view of the Hot Spots, hasNext 1222 was called 15 million times 1228, which was very surprising. No one knew it was used this much. Developers then started looking at hasNext 1222 to understand why it was being called so many times. Profiler makes it possible to click on the info button 1288 at bottom of the screen, and view details of the profile 1310 for calls to the hasNext class, as shown in FIG. 13. Profiling type 1345 is shown in the information block. The profile duration can be calculated as 6 min 55 seconds, by subtracting the 'snapshot taken' time from the 'data collected from' time 1325, with hasNext 1222 using over 3 minutes of the almost 7 minutes profiled.

To view a specific profile result, the developer can select the View button 1422 in FIG. 14 and select among the profile entries in the Request Type column 1424, choosing a specific operation 1426 to view a specific request. They can use the report specifics to debug a problem, drilling down to isolate a section of code away from everything else. A developer may want to request a report of the ten slowest functions into a log, for example, to review, as part of ongoing efforts to increase efficiency in the cloud. The disclosed technology that provides configurable profile views that accurately represent the order of execution of applications and methods, as though they ran on one machine, is a powerful tool for debugging and for increasing efficiency for platforms as a service, and for software as a service.

Multi-App Profiler Workflow

FIG. 15 is a flowchart 1500 of one implementation of multi-app resource usage tracking Flowchart 1500 can be implemented by one or more processors configured to receive or retrieve information, process the information, store results, and transmit the results. Other implementations may perform the actions in different orders and/or with different, fewer or additional actions than those illustrated in FIG. 15. Multiple actions can be combined in some implementations.

At action 1515, the multi-app resource usage tracking system receives and enables filter settings from a user or from a preconfigured test profile. At action 1520, the multi-app profiler logs autonomous log units that capture data recording the service entries to and service exits from multiple cascading service invocations across hardware instances. The captured data includes a transaction ID that spans services and classes invoked by a transaction invocation, a transaction invocation URI for the service, an identifier for the class or service, and time stamps of the service entries and the service exits. The captured data can optionally also include CPU time, organization ID, user ID, a server request URI, minimum elapsed time, a set of server IDs, or an identifier for a calling service that invoked the service entered.

At action 1525, the resource usage tracking profiler analyses performance of transaction invocations, organizing the autonomous log units into nested service invocations. At action 1530, the resource usage tracker profiles the performance of the cascading invocation. At action 1535, the multi-app resource usage tracking profiler reports and persists the results of analyzing the performance.

Computer System

FIG. 16 is a block diagram of an example computer system 1600 for implementing a multi-app resource usage tracking system. FIG. 16 is a block diagram of an example computer system, according to one implementation. The processor can be an ASIC or RISC processor. It can be an FPGA or other logic or gate array. It can include graphic processing unit (GPU) resources. Computer system 1610 typically includes at least one processor 1672 that communicates with a number of peripheral devices via bus subsystem 1650. These peripheral devices may include a storage subsystem 1626 including, for example, memory devices and a file storage subsystem, user interface input devices 1638, user interface output devices 1678, and a network interface subsystem 1676. The input and output devices allow user interaction with computer system 1610. Network interface subsystem 1676 provides an interface to outside networks, including an interface to corresponding interface devices in other computer systems.

User interface input devices 1638 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include the possible types of devices and ways to input information into computer system 1610.

User interface output devices 1678 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include the possible types of devices and ways to output information from computer system 1610 to the user or to another machine or computer system.

Storage subsystem 1624 stores programming and data constructs that provide the functionality of some or all of the modules and methods described herein. These software modules are generally executed by processor 1672 alone or in combination with other processors.

Memory 1622 used in the storage subsystem can include a number of memories including a main random access memory (RAM) 1634 for storage of instructions and data during program execution and a read only memory (ROM) 1632 in which fixed instructions are stored. A file storage subsystem 1636 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 336 in the storage subsystem 1626, or in other machines accessible by the processor.

Bus subsystem 1650 provides a mechanism for letting the various components and subsystems of computer system 1610 communicate with each other as intended. Although bus subsystem 1650 is shown schematically as a single bus, alternative implementations of the bus subsystem may use multiple busses.

Computer system 1610 can be of varying types including a workstation, server, computing cluster, blade server, server farm, or any other data processing system or computing device. Due to the ever-changing nature of computers and networks, the description of computer system 1610 depicted in FIG. 16 is intended only as one example. Many other configurations of computer system 1610 are possible having more or fewer components than the computer system depicted in FIG. 16.

Particular Implementations

In one implementation, a method of tracking resource usage of a cloud based system, the method includes setting filters responsive to user input, from a selected test profile, that control a scope of profiling of service entry and service exit data across multiple services running on multiple hardware instances wherein transaction invocations cause cascading service invocations of the multiple services. The method further includes accessing autonomous log units spawned by the multiple services, the autonomous log units generated responsive to the filters, wherein the autonomous log units capture data recording the service entries to and service exits from the multiple services, including for each service entered as a result of a transaction invocation. The captured data includes at least a transaction ID that spans services and classes invoked by a transaction invocation, a transaction invocation URI that spans services and classes invoked following the transaction invocation for the service (the thread), a class identifier, and time stamps of the service entries and the service exits.

The method of tracking resource usage also includes analyzing performance of transaction invocations, by organizing the autonomous log units logged across the hardware instances, using at least transaction ID to organize the autonomous log units into nested service invocations, and profiling performance of the cascading invocations. Further the method includes reporting, representing and persisting results of analyzing the performance.

This method and other implementations of the technology disclosed can include one or more of the following features and/or features described in connection with additional methods disclosed. In the interest of conciseness, the combinations of features disclosed in this application are not individually enumerated and are not repeated with each set of captured data in the autonomous log units.

The method further includes service invocation wrappers that wrap the multiple services and spawn the autonomous log units. In some implementations, the method can further include reporting multiple formats of the results of analyzing the performance. The method can further include setting filters with values from a selected test profile.

In some implementations, the method can further include captured data that includes CPU times of the services, and can include captured data that includes a user ID. Additionally, the method can include captured data that includes all code and users, or captured data that includes an organization (org or organization ID).

Some methods can further include captured data that includes an identifier for the class or service that invoked the service entry, or a service requested by URI. Some methods include a filter that includes a minimum elapsed time threshold to be met before spawning the autonomous log unit, making it possible to profile only long running transactions. In yet other implementations captured data can include a set of server IDs from which the multiple services will capture data, so that developers can review activity on a particular server(s).

In yet other implementations, the method can further include a scope of profile reporting limited by an option to mark a service or class as a terminal profiling level. A terminal profiling level can be used to hide code for child services or classes invoked by the marked service or class, when reporting the results of analyzing the performance.

Other implementations may include a computer implemented system to perform any of the methods described above. Yet another implementation may include a tangible computer-readable memory including computer program instructions that cause a computer to implement any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method comprising:
    setting filters to control a scope of tracking at least one of service entry data and service exit data, across multiple services running on multiple hardware instances, wherein the setting the filters comprises configuring transaction invocations to invoke cascading service invocations of the multiple services;
    running an interpreter, configured to be run as an instance on the multiple hardware instances, to specify a profiled service, profiled method, or profiled class, corresponding to the service entry data or the service exit data for tracking as set in the filters, to receive a transaction ID among the multiple services, and to spawn an autonomous log unit upon entry or exit of any of the multiple services that correspond to the profiled service, profiled method, or profiled class, at an event boundary corresponding to the entrance or the exit;
    applying the filters so that the autonomous log unit records at least one of the entry and exit of the multiple services corresponding to the profiled service, profiled method, or profiled class,
    wherein, as a result of a given transaction invocation of the transaction invocations, the data captured by the autonomous log unit comprises:
        a transaction ID configured to span services and classes invoked following the given transaction invocation, a URI for the given transaction invocation,
an identifier for the service or class entered or exited,
a time stamp of a given service entry of the service entries or a given service exit of the service exits; and
a CPU time corresponding to the given transaction invocation;
analyzing performance of at least some of the transaction invocations by organizing the data captured by the autonomous log unit across the multiple services, organizing the autonomous log unit into nested service invocations by corresponding transaction IDs of the transaction invocations, and generating a single profile view of performance metrics of the cascading service invocations;
persisting results of the analyzing;
implementing service protection process that comprises determining, based on the single profile view, that the CPU time corresponding to the given transaction invocation exceeds a maximum CPU time corresponding to the given transaction; and
upon the determining that the CPU time corresponding to the given transaction invocation exceeds a maximum CPU time corresponding to the given transaction invocation, enforcing the governor limit for the given transaction invocation via the interpreter, wherein the maximum CPU time is determined based at least in part on whether the given transaction invocation corresponds to a synchronous process or to an asynchronous process.

2. The method of claim 1, wherein service invocation wrappers invoke the autonomous log unit for the multiple services.

3. The method of claim 1, further comprising receiving a selection of a test profile and setting the filters with values from the test profile.

4. The method of claim 1, wherein the maximum CPU time corresponding to the given transaction invocation is a predetermined value depending on whether the given transaction invocation corresponds to a synchronous process or an asynchronous process.

5. The method of claim 1, wherein setting the filters further includes setting a selected user ID, and wherein the captured data for each service entered further includes the selected user ID.

6. The method of claim 1, wherein setting the filters further includes setting a selected organization ID, and the captured data for each service entered further includes the selected organization ID.

7. The method of claim 1, wherein the captured data for each service entered further includes an identifier for a calling service that invoked the service entered.

8. The method of claim 1, wherein the captured data for each service entered further includes a URI for the service entered.

9. The method of claim 1, wherein the filters include a minimum elapsed time threshold to be met before invoking the autonomous log unit.

10. The method of claim 1, wherein the filters include a set of server IDs for servers from which the multiple services are configured to capture data.

11. The method of claim 1, wherein a scope of profile reporting is limited by an option to mark a service or class as a terminal profiling level, whereby child services or classes invoked by the marked service or class are hidden when reporting the results of analyzing the performance.

12. A computer implemented system applied to tracking resource usage of a cloud based system, the computer implemented system including:
a processor; and
memory coupled to the processor, wherein the processor is configured to perform operations comprising:
setting filters to control a scope of tracking at least one of service entry data and service exit data across multiple services running on multiple hardware instances, wherein the setting the filters comprises configuring transaction invocations to invoke cascading service invocations of the multiple services;
running an interpreter, configured to be run as an instance on the multiple hardware instances, to specify a profiled service, profiled method, or profiled class, corresponding to the service entry data or the service exit data for tracking as set in the filters, to receive a transaction ID among the multiple services, and to spawn an autonomous log unit upon entry or exit of any of the multiple services that correspond to the profiled service, profiled method, or profiled class, at an event boundary corresponding to the entrance or the exit;
applying the filters so that the autonomous log unit records at least one of the entry and exit of the multiple services corresponding to the profiled service, profiled method, or profiled class,
wherein, as a result of a given transaction invocation of the transaction invocations, the data captured by the autonomous log unit comprises:
a transaction ID configured to span services and classes invoked following the given transaction invocation,
a URI for the given transaction invocation,
an identifier for the service or class entered or exited,
a time stamp of a given service entry of the service entries or a given service exit of the service exits; and
a CPU time corresponding to the given transaction invocation;
analyzing performance of at least some of the transaction invocations, by organizing the data captured by the autonomous log unit across the multiple services, organizing the autonomous log unit into nested service invocations by corresponding transaction IDs of the transaction invocations, and generating a single profile view of performance metrics of the cascading service invocations;
persisting results of the analyzing;
implementing service protection process that comprises determining, based on the single profile view, that the CPU time corresponding to the given transaction invocation exceeds a maximum CPU time corresponding to the given transaction; and
upon the determining that the CPU time corresponding to the given transaction invocation exceeds a maximum CPU time corresponding to the given transaction invocation, enforcing the governor limit for the given transaction invocation via the interpreter, wherein the maximum CPU time is determined based at least in part on whether the given transaction invocation corresponds to a synchronous process or to an asynchronous process.

13. The computer implemented system of claim 12, wherein service invocation wrappers invoke the autonomous log unit for the multiple services.

14. The computer implemented system of claim 12, wherein the maximum CPU time corresponding to the given transaction invocation is a predetermined value depending on whether the given transaction invocation corresponds to a synchronous process or an asynchronous process.

15. The computer implemented system of claim 12, wherein the setting the filters further includes setting a selected user ID, and wherein the captured data for each service entered further includes the selected user ID.

16. The computer implemented system of claim 12, wherein setting the filters further includes setting a selected organization ID, and the captured data for each service entered further includes the selected organization ID.

17. The computer implemented system of claim 12, wherein the captured data for each service entered further includes a URI for the service entered.

18. The computer implemented system of claim 12, wherein the filters include a minimum elapsed time threshold to be met before invoking the autonomous log unit.

19. A non-transitory computer-readable storage medium that stores program instructions that implement tracking resource usage of a cloud based system, wherein the instructions, when executed by at least one processor, cause the at least one processor to perform operations including:

setting filters to control a scope of tracking at least one of service entry data and service exit data across multiple services running on multiple hardware instances, wherein the setting the filters comprises configuring transaction invocations to invoke cascading service invocations of the multiple services;

running an interpreter, configured to be run as an instance, on the multiple hardware instances, to specify a profiled service, profiled method, or profiled class, corresponding to the service entry data or the service exit data for tracking as set in the filters, to receive a transaction ID among the multiple services, and to spawn an autonomous log unit upon entry or exit of profiled services or classes, at an event boundary corresponding to the entrance or the exit;

applying the filters so that the autonomous log unit records at least one of the entry and exit of the multiple services corresponding to the profiled service, profiled method, or profiled class, wherein, as a result of a given transaction invocation of the transaction invocations, the data captured by the autonomous log unit comprises:
 a transaction ID configured to span services and classes invoked following the given transaction invocation,
 a URI for the given transaction invocation,
 an identifier for the service or class entered or exited,
 a time stamp of a given service entry of the service entries or a given service exit of the service exits; and
 a CPU time corresponding to the given transaction invocation;

analyzing performance of at least some of the transaction invocations organizing the data captured by the autonomous log unit across the multiple services, organizing the autonomous log unit into nested service invocations by corresponding transaction IDs of the transaction invocations, and generating a single profile view of performance metrics of the cascading service invocations;

persisting results of the analyzing;

implementing service protection process that comprises determining, based on the single profile view, that the CPU time corresponding to the given transaction invocation exceeds a maximum CPU time corresponding to the given transaction; and upon the determining that the CPU time corresponding to the given transaction invocation exceeds a maximum CPU time corresponding to the given transaction invocation, enforcing the governor limit for the given transaction invocation via the interpreter, wherein the maximum CPU time is determined based at least in part on whether the given transaction invocation corresponds to a synchronous process or to an asynchronous process.

20. The non-transitory computer-readable storage medium of claim 19, wherein service invocation wrappers invoke the autonomous log unit for the multiple services.

21. The non-transitory computer-readable storage medium of claim 19, further comprising receiving a selection of a test profile and setting the filters with values from the test profile.

22. The non-transitory computer-readable storage medium of claim 19, wherein setting the filters further includes setting a selected user ID, and wherein the captured data for each service entered further includes the selected user ID.

23. The non-transitory computer-readable storage medium of claim 19, wherein setting the filters further includes setting a selected organization ID, and the captured data for each service entered further includes the selected organization ID.

24. The non-transitory computer-readable storage medium of claim 19, wherein the captured data for each service entered further includes an identifier for a calling service that invoked the service entered.

25. The non-transitory computer-readable storage medium of claim 19, wherein the filters include a set of server IDs for servers from which the multiple services are configured to capture data.

* * * * *